Patented Mar. 29, 1927.

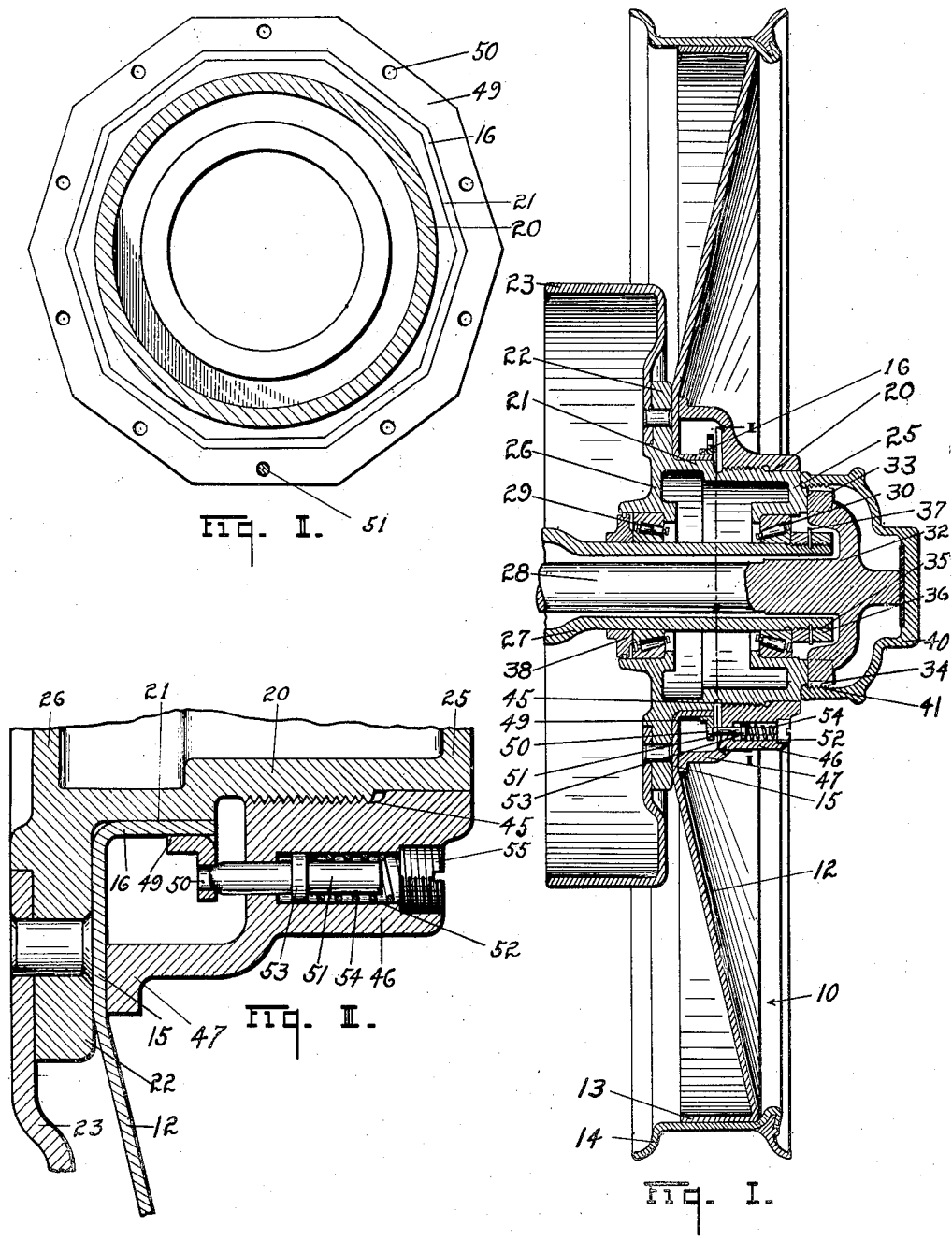

1,622,310

UNITED STATES PATENT OFFICE.

LEWIS FINE, OF PHILADELPHIA, PENNSYLVANIA, ASSIGNOR, BY MESNE ASSIGN-MENTS, TO BUDD WHEEL COMPANY, OF PHILADELPHIA, PENNSYLVANIA, A CORPORATION OF PENNSYLVANIA.

VEHICLE WHEEL CONSTRUCTION.

Application filed January 2, 1919. Serial No. 269,289.

This invention relates to an improved vehicle wheel construction, especially adapted for the disc type of wheel, the invention having for one of its objects to provide a particularly simplified construction whereby a wheel is made detachable from the hub as well as the vehicle axle the arrangement providing a simple and light wheel designed to be interchangeable between the front and rear axles whereby an extra or spare wheel carried by a motor vehicle, for example, may be easily applied to and removed from the hub of the vehicle without removing the hub from the axle.

Further objects of the invention relate broadly to a wheel assembly in which the wheel is detachable from the hub thereof, and when assembled on the driving axle of the vehicle, for example, is so designed that the power may be efficiently transmitted from the axle to the wheel while at the same time the wheel may be interchangeable with the front axle of the vehicle.

Further objects of the invention relate to a novel construction, per se for transmitting the power from the axle to the wheel of the vehicle, through the simplified means provided for retaining the wheel and hub in assembled relation on the axle; to provide a simplified means for locking the wheel in proper assembled relation to prevent an accidental removal thereof during use of the vehicle; and to provide a mechanism of the character described which is at the same time particularly adapted for being easily applied and removed from the axle in a manner specified. Further objects of the invention are to provide a novel type of disc for a disc wheel to which certain features of the invention as hereinbefore suggested are particularly adapted, and the invention also includes a construction in which the wheel may be detached from the hub or axle of a vehicle without necessitating removal of an axle cap or a removal of the axle or any portion thereof in order to remove the wheel.

Further objects of this invention relate to economies in the manufacture of a wheel of the character specified, as well as the details of construction as will hereinafter appear from a detailed description to follow. I accomplished the objects of my invention in one instance by the devices and arrangements described in the following specification but it is to be understood and evidenced that the same may be varied widely without departing from the scope of the invention, as pointed out in the appended claims. A structure constituting one embodiment of the invention, which may be the preferred, is illustrated in the accompanying drawings forming a part hereof, in which:

Fig. I is a vertical-sectional view showing one embodiment of this type of wheel assembled on the rear or driving axle of a motor vehicle.

Fig. II is a sectional view showing the configuration of parts for the driving connections between the hub and the wheel.

Fig. III is an enlarged sectional view showing one efficient locking means for retaining the wheel and hub in assembled relation.

It is to be understood that this invention has certain broad aspects and is not limited to the particular type of wheel, hub or axle described herein, but in certain regards is generic, including the idea of having a wheel detachable from the hub, and means to retain the same in assembled relation on a vehicle. However, I have shown herein a disc type of wheel, the wheel itself having certain novel characteristics. The wheel proper is designated by the numeral 10 and as shown consists in providing a dished disc 12 with a lateral peripheral flange 13 adapted to receive the rim 14 of the wheel, to receive a tire in a well known manner; the disc 12 adjacent the central part surrounding the hub receiving opening therein having a relatively flat portion 15 which lies substantially in a plane parallel to the plane of rotation of the wheel terminating in an outwardly extending flange 16, extending in the opposite direction to the peripheral flange 13. This construction provides a particularly strong efficient wheel which may be made relatively light but strong and effective to serve the purposes of prior constructions of a heavier type. The flange 16 is made polygonal as shown in Fig. II, and in the particular construction shown herein, this polygonal flange 16 is a decagon. The wheel thus described is arranged to be removed from and attached to the hub of the wheel as a unit, with the hub preferably permanently associated with the vehicle axle although capable of being disassembled. To this end, a simplified type of hub construction is also provided herein, and it will be seen that the hub proper 20 is provided with a polygonal exterior surface on a portion thereof indicated at 21. This polygonal surface is in the form of a decagon corresponding to the flange 16 on the wheel which rests thereon. The hub 20 is also provided with an outwardly extending flange 22 adapted to form a surface against which the flat portion 15 of the disc 12 bears and may be clamped when the wheel is retained in position assembled on the axle. In a case of a rear wheel construction, this flange 22 also forms means to support the brake flange or drum 23, as will be apparent from an inspection of Fig. I. It will appear that with this construction the disc may be demounted from the hub without demounting the brake drum so that the wheel, 10, may be disconnected from the axle without demounting the brake drum. The hub 20 is provided with an outer radial flange 25 and an inner radially extending portion 26 to form pockets or receiving openings for positioning the bearings of the hub on the axle of the vehicle. The form of axle illustrated, has a tubular casing 27 and the driving shaft 28 located within the same, the tubular axle casing 27 forming the means on which a plurality of roller bearings 29 and 30 are supported in recesses formed in the extensions 25 and 26 of the hub member 20, the wheel being thus rotatable on the axle casing. The outer end of the shaft 28 is provided with a driving clutch or transmission connection 32 having arms 33 which engage projections 34 on the hub member 20 to drive the same, as will be readily understood by those skilled in the art. It is evident that any other type of driving connection between an axle and the hub may be used, and it is furthermore to be understood that my invention is not limited to the assembly on a driving axle but may be used with a wheel applied to the front axle of a motor vehicle. If desired, the tubular axle casing 27 is provided with a screw threaded end 35 to receive a screw threaded ring 36 pinned thereto by the pins 37, acting as means for retaining the roller bearing 30 in place in the portion 25 of the hub member, while a flange 38 at the rear portion of the assembly maintains the other bearing 29 against its seat in the extension 26 of the hub member at the rear portion thereof.

It will be seen that an axle cap 40 may be used for fitting over the end of the axle and is screw threaded at 41 to a portion of the hub member 20. As will hereinafter appear, this cap 40 may be retained in its assembled position on the hub over the end of the axle without interfering with the removal of the wheel from the hub.

While any suitable means may be employed for retaining the wheel on the hub, the particular arrangement disclosed herein is of such simplified construction as to be particularly desirable in the assembly as a whole. To this end the hub 20 is provided with screw threads 45 adapted to receive a threaded ring 46 having a cup-shaped inner end and provided with a flange 47 thereon, the ring being adapted to be screw threaded home on the hub member 20 and cause the flange 47 to bear against the flat portion 15 of the disc 12 of the wheel and clamp the same against the flange 22 of the hub member. The bearing area afforded by the flange 22 and the flat portion 15 of the disc thus forms a particularly efficient means for clamping the two in assembled relation. Means may also be provided, if desired, to lock the clamping ring 46 in assembled position to prevent an accidental removal thereof and to this end one efficient means therefor consists in providing the flange 16 of the disc wheel with a polygonal shaped ring 49 spot welded, wedged or otherwise secured thereon and providing a plurality of openings 50 therein, adapted to receive a locking means 51 carried by the clamping ring 46. It is apparent that the disc 12 could be provided with integral means for receiving a locking member on the ring 46 and the ring 49 might be dispensed with, so long as means are provided between the disc and the member 46 to prevent accidental rotation of ring, 46. Moreover, any type of locking means other than that described herein might be used. It will be noted that pin 51 in the particular construction shown herein is located in a recess 52 in the clamping or retaining member 46, and is provided with a collar 53 thereon against which a coiled spring 54 bears to normally tend to project the pin from the clamping ring 46 so as to cause the same to automatically enter one of the openings 50 in the ring 49 as the clamping member 46 is applied. The recess 52 may be closed by screw threaded plug 55 which forms means against which one end of the spring 54 may bear in operating to project the pin in locking position. It will be noted that the pin, 51, is larger in diameter than the opening, 50, and that the rounded end of the pin engages in the opening to prevent accidental rotation of the ring, 46. When force is applied to said ring, however, to rotate it, the rounded end of the pin, 51, acts like a pawl on the openings, which are equivalent to a ratchet, so that, as the ring rotates, the pin passes from one opening to the next with a ratchet action.

It is believed that the use of the invention and the manner of assembly will be understood from the foregoing. It will be seen that the hub 20 may be assembled on the axle of the vehicle in a manner well known in the art, and by the construction shown such assembly will be readily understood. It will be seen that in the case of a rear wheel construction, the driving shaft 28 is in power transmitting relation to the hub 20 by reason of the arm 32 connected at the end of the shaft. The cap 40 is located on the hub 20 and thereafter the wheel is slid over the hub until its polygonal shaped flange 16 engages the correspondingly shaped portion 21 of the hub with the flat portion 15 of the disc bearing against the flange 22 of the hub. Thereupon the retainer 46 is screwed home on the hub to cause the flange 47 thereof to bear against the flat portion 15 of the disc and clamp it against the flange 22. Upon assembly of the ring or retaining member 46, the locking mechanism automatically locks the ring to the wheel and retains the parts in assembled relation. It will thus be seen that I have provided a simplified construction in which a wheel may be readily attached to and detached from the hub of a vehicle without removing the hub from the axle or the cap 40 from the hub. It will also be seen that the wheel itself, carried as an extra or spare wheel on a vehicle, is light and, therefore, may be handled and readily manipulated in assembling and applying the wheel on a hub and axle. Attention is called to the fact that the retainer 46 constitutes a simplified arrangement for maintaining the parts in assembled relation when once put together in the manner set forth and by providing an additional locking means, a complete construction is formed which is particularly efficient for uses to which the device is intended to be put. Attention is further called to the fact that the disc wheel itself is constructed to facilitate its manufacture and that its construction produces a particularly strong and efficient wheel by reason more particularly of the formation given thereto.

While I have described my invention in more or less detail and as being embodied in certain forms, I do not desire or intend to be limited thereto, as on the contrary my invention contemplates, as heretofore suggested, all proper changes as well as the omission of immaterial elements and the substitution of equivalents therefor, as circumstances may suggest or necessity render expedient.

Having thus described my invention, what I desire to secure by Letters Patent of the United States and claim is:

1. A wheel of the class described, comprising the combination of a hub, having a portion of non-circular cross section, a wheel disc having a central opening therein and a portion of non-circular cross section surrounding said opening, a retaining member screwed on said hub and clamping said disc thereto, and a locking member carried by said retaining member and engaging said disc to prevent rotation relative thereto.

2. A wheel of the class described, comprising the combination of a hub having a radial flange and a portion of non-circular cross section, adjacent the base of said flange, a wheel disc having a central opening therein, a portion of non-circular cross section surrounding said central opening and a portion parallel to the plane of rotation of the wheel, adjacent said central opening, and contacting with said hub flange, and a retaining member having a cup-shaped inner end housing the non-circular portions of said disc and hub, and having an annular flange clamping said disc to said hub flange, said retaining member being secured on said hub.

3. A wheel comprising a hub having a radial flange, and a seating shoulder of non-circular cross-section at the base of said flange, a disc having a central opening therein, and a flange of non-circular cross-section surrounding said opening, and fitting said shoulder, an annular locking member secured on said flange of the disc, a clamping member screwed on said hub and engaging the disc to clamp the same to the hub, and a detent carried by said clamping member and engaging said annular locking member.

4. A wheel comprising the combination of a hub having a seating shoulder of non-circular cross-section, a disc having a central opening and a flange of non-circular cross-section surrounding said central opening and fitting the seating shoulder of the hub, an annular member secured to the exterior of said flange and provided with a plurality of recesses, a retaining element screwed on the hub and engaging the disc to clamp the same to the hub, and a spring-pressed locking pin carried by said element and adapted to engage the recesses of said locking member.

In testimony whereof, I affix my signature.

LEWIS FINE.